United States Patent Office 2,748,084
Patented May 29, 1956

2,748,084

METHOD FOR CLEANING CARBONACEOUS MATERIAL AND SOIL FROM SURFACES

Earl R. De Lew, Corte Madera, and Fred G. Michaelis, San Francisco, Calif., assignors to Yosemite Chemical Co., San Francisco, Calif., a corporation of California No Drawing. Application November 19, 1952,
Serial No. 321,512

2 Claims. (Cl. 252—172)

This invention relates to the cleaning of carbonaceous material and soil from metallic or non-metallic surfaces; and more particularly to the cleaning of electrical equipment such as generators, motors and switchboards.

Most electrical equipment gradually accumulates an appreciable amount of carbonaceous material and soil on its surface. The carbonaceous material is usually composed primarily of graphite, and the soil generally consists of oily or greasy material containing dirt. This accumulation of carbonaceous material and soil interferes with the operation of the electrical equipment; and for efficient operation it is necessary to clean such equipment with a grease solvent such as carbon tetrachloride. Although such a grease solvent may effectively remove the soil, it has very little effect on the graphite which adheres tenaciously to the surfaces to be cleaned. The graphite cannot be removed even by repeated cleanings with ordinary grease solvents; and the accumulated material ultimately results in inefficient operation of the equipment. Furthermore, carbon tetrachloride which is the grease solvent commonly employed, presents hazards to the workmen where the equipment is in confined quarters, such as in the hold of a ship or in a submarine, because of the highly toxic character of this solvent.

Summarizing this invention, it has as its objects, among others, the provision of a cleaning composition and method particularly adapted for the cleaning of carbonaceous material and soil from surfaces, and which will effectively remove the carbonaceous material, such as graphite, from electrical equipment such as generators, motors, switchboards, switches and other electrical parts. Pursuant to this invention, it has been found that if a surface which is dirtied by soil and carbonaceous material is subjected to the simultaneous effect of water and a grease solvent immiscible with the water, the carbonaceous material is effectively freed from the area of the surface which is in contact with the interface between the two liquids which are not miscible with each other. Preferably, the water and the solvent immiscible with the water is in the form of an emulsion or fine dispersion so as to increase materially the interfacial areas between the solvent and the water.

In the preparation of the preferred emulsion composition of this invention, any suitable grease solvent, or mixtures thereof, which is substantially immiscible with water can be employed. The emulsion must be of such character that the water is in the dispersed phase in the form of minute discrete particles, and the solvent is in the continuous phase. The solvent and water may be emulsified by agitation, using any suitable homogenizer, and thereafter the emulsion may be quickly applied to the surface to be cleaned. However, a mechanically produced solvent and water emulsion breaks rapidly and the user should again emulsify the mixture just before use. Consequently, for commercial purposes it is preferable to prepare an emulsion of water and solvent by incorporating a relatively small amount of emulsifying agent in the mixture.

In applying the composition to the surface to be cleaned, any suitable method of application may be employed, such as brushing the surface with the emulsion, dipping the object in the emulsion, or preferably by spraying with a liquid spray nozzle. The surface is subjected to the emulsion so that the soil and carbonaceous material thereon are entirely wetted, and the emulsion is allowed to remain in contact with the surface for a period of time sufficient to allow the emulsion to penetrate thoroughly into the soil and thereby loosen the carbonaceous material. After this, the surface is again subjected to a fresh amount of the emulsion which results in washing off the first applied emulsion together with substantially all of the carbonaceous material and the soil which have been freed from the surface. The clean surface may then be allowed to dry either by open air drying or by subjecting the surface to blasts of air if it is desired to expedite the drying.

In greater detail, the proportions of the water and solvent may vary widely. Of the total amount of water and solvent, the water may be as low as about 1 part or percent by volume and as high as about 50 parts or percent by volume, and correspondingly, the proportion of solvent may vary from about 99 to 50 parts or percent by volume. For cleaning of electrical parts, it is not desirable to use an emulsion containing relatively large percentages of water, because such a cleaning composition would leave excessive residual moisture on the processed parts. Furthermore, relatively large quantities of water will produce a very stiff emulsion which presents handling problems. Therefore, for practical reasons the proportion of water in the emulsion should not be much greater than about 20 parts or percent by volume to about 80 parts or percent by volume of solvent. On the other hand, there should be sufficient water present to permit the formation of a two phase water-solvent system. According to present experience, the lower limit of water content should be not less than about 1 part or percent by volume to about 99 parts or percent by volume of solvent.

From the preceding, it is seen that of the total amount of solvent and water, the proportions may vary as follows, in percent and parts by volume:

| | | |
|---|---:|---:|
| Water | 50 | 1 |
| Solvent | 50 | 99 |
| | 100 | 100 |

Best results are obtained in the proportions of about 3 to 12 percent by volume of water of the total amount of water and solvent.

As previously related, it is preferable to use a relatively small amount of an emulsifying agent in formulating commercial preparations of the cleaning emulsion composition. The resultant emulsion is relatively more stable than a mechanical dispersion produced by a homogenizer or colloid mill in the absence of an emulsifier.

The amount of the emulsifying agent employed should preferably be just sufficient to produce an emulsion which is substantially stable by itself but yet is readily breakable when contacted with the soil to be removed, although more stable emulsions can be used. The readily breakable emulsion is preferred because the described interfacial action is more pronounced the more breakable the emulsion. The amount of emulsifying agent is governed by the water to solvent ratio as well as by the composition of the solvent; and consequently, a relatively wide range in the proportion of the emulsifying agent may be used.

With respect to the practical water to solvent ratio previously pointed out wherein the water may be as low as about 1 per cent by volume and as high as approximately 20 per cent by volume of the total amount of solvent and water, the emulsifier may vary from as low as about 2 per cent by volume to as high as about 8 per cent by volume of the total volume of water, solvent and emulsifier, depending on the water to solvent ratio. For the previously related water to solvent ratio which produces best results, wherein the water is about 3 to 12 per cent by volume of the total amount of water and solvent, the emulsifier may be as low as about 2 per cent by volume and as high as about 6 per cent by volume of the total volume of water, solvent and emulsifier, depending on the water to solvent ratio.

The character of the solvent employed in the emulsion may vary widely. The only important requirements are that the solvent dissolve grease, be liquid at room temperatures and pressures, and be immiscible with water. The particular solvent, or mixtures of solvents, employed in a given situation should preferably be based primarily upon the environment in which the composition is to be employed. For example, if the composition is to be employed in a place where there is a fire hazard, the solvent should have a relatively high flash point. When the cleaning emulsion is employed in close quarters where toxicity is of equal importance to the fire hazard, the solvent, or mixtures thereof, should be also of low toxicity. Also, under all circumstances, it is desirable that the solvent have a rapid evaporation rate and that it be comparatively low in cost.

In general, hydrocarbon solvents of high flash point have a slow rate of evaporation and it may be necessary to select a solvent that is a compromise between these two factors. On the other hand, halogenated solvents have high flash points in comparison to their rate of evaporation; and some of them, such as methylene chloride, carbon tetrachloride, and perchloroethylene have no flash point at all. The chlorinated solvents are considerably more toxic and expensive than hydrocarbon solvents. Aromatic hydrocarbon solvents are generally more efficient in removing grease than aliphatic hydrocarbon solvents. However, aromatic hydrocarbon solvents are generally more toxic than the aliphatic hydrocarbon solvents. With these factors in mind, a suitable solvent, or mixture of solvents, should be chosen in accordance with the conditions under which the composition is to be employed.

Among the wide range of the solvents having the described properties that may be used are aliphatic hydrocarbons, aromatic hydrocarbons, and halogen substituted hydrocarbons as well as mixtures of such solvents. Aliphatic hydrocarbons that may be employed include the straight chain as well as branched chain paraffines, cycloparaffines and naphthenes. Examples of such aliphatic hydrocarbons are hexane, heptane, and their isomers, cyclopentane, cyclohexane and their alkylated homologues, such as methyl cyclopentane and methyl cyclohexane. Naphtha, which consists chiefly of a mixture of hydrocarbons of the above mentioned types, is the most practical and economical choice. Aromatic hydrocarbons such as benzene, and alkylated benzenes such as toluene and xylene, and ethylbenzene are also suitable. Useful halogen substituted hydrocarbons include methylene chloride, trichloromethane (chloroform), difluorotetrachloro ethane, ethylene dichloride, trichloroethylene, carbon tetrachloride, perchloroethylene, monochlorobenzene, and dichlorobenzene.

The solvent, or mixture of solvents, is not limited to the foregoing compounds but may be any of the well known compositions having the prescribed properties. Water soluble solvents such as the aliphatic alcohols, ketones and certain ethers, such as ethyl ether, are of course not suitable for use in this invention because they are entirely or partially miscible with water.

Insofar as emulsification is concerned, the emulsifying agent may be any of the well known substances used for stabilizing emulsions. However, in emulsions that are used for cleaning electrical equipment or are specifically designed for such use, at which this invention aims, the emulsifying agent should not be a conductor of electricity. This is important because emulsifying agents that conduct electricity have been found to have an adverse effect upon the electrical characteristics of the parts. Emulsifying agents containing amino groups are also detrimental because they attack copper, and therefore should not be used.

Examples of emulsifying agents suitable for use in the cleaning composition of this invention are the esters of hexahydric alcohols, such as the esters of sorbitol and mannitol, for example, the mono or dioleates, the mono or di-palmitates, and the mono or dilaurates of these alcohols. Also, similar esters derived from the mono anhydrides and dianhydrides of such alcohols are suitable. The mono and dianhydrides of sorbitol are known, respectively, as "Sorbitan" and "Sorbide" (Atlas Powder). The condensation reaction products of the aforementioned alcohols with polyoxyethylenes, also provide suitable esters that can be used as the emulsifying agent. The preferred emulsifying agent is "Span 20" (Atlas Powder) which is the monolaurate of "Sorbitan" ("Sorbitan" being the mono anhydride of sorbitol). The emulsifying agents may be generally classified as esters of polyhydroxy compounds.

The following are typical examples of cleaning compositions prepared in accordance with this invention; in parts and per cent by volume. All flash points in this and the succeeding examples are determined by the Cleveland Open Cup Method (C. L. O. C.) which is A. S. T. M. Method No. D-92-33:

*Example I*

```
Solvent_____ 92
    Perchloroethylene (flash point none)_____ 30
    Methylene chloride (flash point none)_____ 15
    Aromatic petroleum naphtha (flash point 148° F.)_ 55
                                                    ---
                                                    100
Water_____ 5
Emulsifying agent ("Sorbitan" monolaurate) (trade name
    "Span 20")_____ 3
                                                    ---
                                                    100
```

For preparation of the composition, mix all the solvents together and place this solvent mixture in a metal container along with the water and the emulsifying agent. Agitate the components mechanically to form the cleaning emulsion composition.

The resultant cleaning emulsion is particularly useful in cleaning electrical equipment such as diesel electric locomotive generators, traction motors and switchboards, where non-flammability is important. It is preferably applied, as previously related by thoroughly wetting the equipment with a liquid spray nozzle, and allowing the composition to stay in contact with the parts until it penetrates the soil and carbonaceous material thereby loosening the carbonaceous material. This will generally take about 5 minutes. Finally, the equipment is flushed clean of the first application of emulsion by a fresh application thereof. Upon drying, which may be open air drying or by means of an air blast, the equipment will be free of graphite and soil.

*Example II*

```
                                             Parts by volume
Solvent_____ 90
    Difluorotetrachloro ethane (flash point none)____ 45
    Aliphatic petroleum naphtha (flash point 60° F.)_ 55
                                                    ---
                                                    100
Water_____ 6
Emulsifying agent (sorbitol dilaurate)_____ 4
                                                    ---
                                                    100
```

The resultant emulsion is excellent for use in cleaning electrical equipment in confined places such as in the holds of ships and in submarines. The toxicity is negligible and the flash point is high. The method of preparation, application, and results in cleaning and freeing graphite are the same as in Example I.

Example III

Another typical formulation in parts and per cent by volume is as follows:

```
Solvent_____ 93
    Commercial preparation of mixed hexanes and
      heptanes, sold under trade name of "Stand-
      ard Mixed Hexanes" (flash point −23° F.)__  58
    Trichloroethylene (flash point none)_____  42
                                                  ───
                                                  100
Water_____  5
Emulsifying agent ("Span 40"—"Sorbitan" monopalmi-
  tate sold by the Atlas Powder Co.)_____   2
                                                  ───
                                                  100
```

The resultant emulsion is relatively quite toxic and is, hence, primarily suitable for outdoor use. It is very volatile, and it has a low flash point. The method of preparation and application, and results in cleaning and freeing graphite are the same as in Example I.

We claim:

1. The method of cleaning electrical equipment dirtied with soil including carbonaceous material and graphite which comprises wetting said equipment with an emulsion of water and a grease solvent in which emulsion the water is the dispersed phase, said grease solvent comprising a mixture of hydrocarbons and halogenated organic compounds which are immiscible with said water, the amount of water in said emulsion being approximately 1% to 20% by volume of the total volume of said water and said solvent, and said emulsion containing an emulsifying agent free of amine groups and incapable of conducting electricity in the amount of from about 2% to 8% by volume of the total volume of said emulsion, allowing said emulsion to penetrate said soil to loosen the graphite by interfacial tension between the solvent and the water, and subsequently subjecting said equipment to a fresh amount of said emulsion.

2. The method of cleaning electrical equipment dirtied with soil including carbonaceous material and graphite which comprises wetting said equipment with an emulsion of water and a grease solvent in which emulsion the water is the dispersed phase, said grease solvent comprising a mixture of hydrocarbons and halogenated organic compounds which are immiscible with said water, the amount of water in said emulsion being approximately 1% to 20% by volume of the total volume of said water and said solvent, and said emulsion containing an emulsifying agent free of amine groups and incapable of conducting electricity, allowing said emulsion to penetrate said soil to loosen the graphite by interfacial tension between the solvent and the water, and subsequently subjecting said equipment to a fresh amount of said emulsion.

References Cited in the file of this patent

UNITED STATES PATENTS

| | | |
|---|---|---|
| 1,038,783 | Nowak | Sept. 17, 1912 |
| 1,340,315 | Baum | May 18, 1920 |
| 2,212,761 | Webster | Aug. 27, 1940 |

FOREIGN PATENTS

| | | |
|---|---|---|
| 584,515 | Germany | Sept. 22, 1933 |

OTHER REFERENCES

Atlas Surface Active Agents, Atlas Powder Co., Delaware, 1948, pages 61 and 62.